United States Patent
Carroll et al.

(10) Patent No.: US 6,501,780 B2
(45) Date of Patent: Dec. 31, 2002

(54) METHOD, SYSTEM AND APPARATUS FOR AN ELECTRICALLY ASSISTED CHEMICAL OXYGEN IODINE LASER

(75) Inventors: David L. Carroll, Urbana, IL (US); Wayne S. Solomon, Champaign, IL (US); Joseph T. Verdeyen, Savoy, IL (US)

(73) Assignee: CU Aerospace, Urbana, IL (US)

( * ) Notice: Subject to any disclaimer, the term of this patent is extended or adjusted under 35 U.S.C. 154(b) by 0 days.

(21) Appl. No.: 09/829,835

(22) Filed: Apr. 10, 2001

(65) Prior Publication Data

US 2001/0036215 A1 Nov. 1, 2001

Related U.S. Application Data

(60) Provisional application No. 60/196,901, filed on Apr. 13, 2000, and provisional application No. 60/242,195, filed on Oct. 23, 2000.

(51) Int. Cl.[7] .......................... H01S 3/22; H01S 3/095; H01S 3/09
(52) U.S. Cl. ............................. 372/55; 372/89; 372/90
(58) Field of Search ...................................... 372/55, 89

(56) References Cited

U.S. PATENT DOCUMENTS

| 6,377,600 B1 | 4/2002 | Flegal ........................ 372/89 |
| 2001/0033597 A1 | 10/2001 | Neumann .................... 372/89 |

OTHER PUBLICATIONS

Endo, M., Sugimoto, D., Okamoto, H., Takaeda, S. and Fukioka, T. (2000). "Performance characteristics of the microwave assisted chemical Iodine oxygen laser", AHPLA '99, Osaka, Nov. 1999, SPIE vol. 3889, pp. 494–502.

Fuji, H. (1994). "COIL Development in Japan," AIAA Paper 94-2419.

Fuji, H., Itami, S., Kihara, Y., Fulisaki, K., Okamura, M., Yoshitani, E., Yano, K., Miyatake, T.,Schmiedberger, J. (2000). "Hybrid Oxygen iodine laser with a discharge singlet oxygen generaor,",Laser Ablation Conference, Santa Fe, 2000.

Itami, S., Nakamura, Y., Nakamura, A., Shinagawa, Kihara, Y., K., Okamura M., Yoshitani, E., and Fujii, H. (2000). "The Development of hybrid oxygen–iodine laser," AHPLA '99 Osaka, Nov. 1999, SPIE vol. 3889. pp. 503–510.

Ivanov, V.V., Klopovsky, K.S. Lopaev, D.V., Rakhimov, A.T., and Rakhimova, T.T. (1999). "Experimental and Theoretical Investigation of Oxygen Glow Discharge Structure at Low Pressures". IEEE Trans. on Plasma Science. 27. p. 1279.

(List continued on next page.)

*Primary Examiner*—Paul Ip
*Assistant Examiner*—Armando Rodriguez
(74) *Attorney, Agent, or Firm*—Adam K. Sacharoff; Hamman & Benn

(57) ABSTRACT

A method, apparatus and system are provided herein for an electrically assisted chemical oxygen iodine laser. The preferred system, in accordance with the present invention, includes a laser resonator with a laser-active gas mixture of at least excited oxygen and dissociated iodine. A first electrical generator in which a primary flow of at least excited oxygen is electrically generated from a first gas that includes at least ground state oxygen. A second electrical generator in which a secondary flow of at least dissociated iodine atoms is electrically generated from a second gas that includes at least diatomic iodine. The system further includes a means to inject the secondary flow into the primary flow to generate the laser-active gas mixture.

32 Claims, 4 Drawing Sheets

OTHER PUBLICATIONS

Okamoto, H., Hirata, T., Shinoda, K., Takeda, S., Sugimoto, D., and Endo, M. (2000). "Supersonic Chemical Oxygen-Iodine Laser with Microwave Predissociation of Iodine," AIAA Paper 2000–2492, Denvcer, CO 19–22, Jun. 2000.

Pazyuk, V.S., Vagin, N.P., Yuryshev, N.N. (1996). "Repetitively Pulsed Chemical Oxgen–Iodine Laser with a Discharge Generation," SPIE vol. 2767, pp. 206–208.

Schmiedberger, J., and Fujii H. (1995). "RF hollow electrode discharge generator of singlet delta oxygen," SPIE vol. 2502, pp. 338–343.

Schmiedberger, J. Takahashi, S., and Fuji H. (1996). "Improved RF plasma jet generation of singlet delta oxygen," SPIE vol. 3092, pp. 694–697.

Endo, M., Sugimoto, D., Okamoto, H., Nanri, K., Uchiyama, T., Takeda, S., and Fujioka, T. (2000). "Output Power Enchancement of a Chemical Oxygen–Iodine Laser by Predissociated Iodine Injection", Jpn. J. Appl. Phys., vol. 39, Part 1, No. 2A, Feb. 2000, pp. 468–474.

Vagin, N.P., Deryugin, A.A., Ionin, A.A., Klimachev, Yu.M., Kochetov, I.V., Naparatovich, A.P.,Sinitsin, D.V., and Yuryshev, N.N. (2000).Breakdown of Highly Excited Oxygen in a DC Electric Field, Plasma Physics Reports, vol. 26, No. 3, pp. 278–282 (Translated from Fizika Plazmy, vol. 26, No. 3, pp. 299–304).

Schmiedberger, J., Hirahara, S., Ichinoche, Y., Suzuki, M., Masuda, W., Kihara, Y., Yoshitania, E., and Fuji, H. (2000) "RF Plasma jet generator of singlet delta oxygen for oxygen–iodine laser," SPIE vol. 4184, pp. 32–35.

Sugimoto, D., Okamoto, H., Wani, F., Endo, M., Takeda, S., and Fujioka, T. (1999). Output Power Enhancement by Predissociation of Iodine in Supersonic Chemical Oxygen Iodine Laser, AAIA Paper 99–3426.

Wakazono, T., Hashimoto, K., Takemoto, T., Uchiyama, T., and Muro M (1998). "The Study of Chemical Oxygen–Iodine Lser Using RF Discharge dissociate of IZ". SPIE vol. 3574, pp. 290–294.

Results of Bolztmann Calculation for Pure $O_2$

Results of Bolztmann Calculation with mix of He:$O_2$ = 1:1

METHOD, SYSTEM AND APPARATUS FOR AN ELECTRICALLY ASSISTED CHEMICAL OXYGEN IODINE LASER

CROSS-REFERENCE TO RELATED APPLICATIONS

The present application claims priority of provision application serial No. 60/196,901, filed on Apr. 13, 2000 and provision application serial No. 60/242,195, filed on Oct. 23, 2000.

GOVERNMENT RIGHTS

This invention was made with Government support under Contract No. F29601-00-C-0086 awarded by the United States Air Force. The Government has certain rights in the invention.

FIELD OF THE INVENTION

This invention relates generally to chemical oxygen iodine lasers (commonly known as "COIL") and more particularly to a method, system and apparatus for an electrically assisted COIL.

BACKGROUND OF THE INVENTION

Since the initial development of the Chemical Oxygen-Iodine Laser (COIL), COIL technology has undergone numerous improvements. However, much of the COIL technology development to date has focused on the singlet-oxygen generator, such as U.S. Pat. Nos. 6,099,805; 6,072,820 and 5,802,095. In a classic COIL system, a singlet-oxygen generator is used to create singlet delta oxygen ($O_2(^1\Delta)$) from gaseous chlorine ($Cl_2$) and liquid basic hydrogen peroxide (BHP), which is a mixture of hydrogen peroxide ($H_2O_2$) and a strong base, such as potassium hydroxide (KOH). This aqueous solution reacts chemically to form $O_2(^1\Delta)$, as well as byproducts such as salt (KCl), and liquid BHP carryover. The $O_2(^1\Delta)$ enters a channel where diatomic iodine molecules ($I_2$) are mixed into the $O_2(^1\Delta)$ flow. The $O_2(^1\Delta)$ and $I_2$ enter a supersonic mixing nozzle and quickly mix to dissociated the $I_2$ into excited iodine atoms (I*). The I* specie is used to extract energy from the mixed gases, which is used by laser cavity mirrors to produce a laser beam. The mixture left over from the lasing will thereafter move farther downstream and enter into a scrubber and thereafter exit to the atmosphere.

Several issues arise from this classic COIL system. First, it is desired to avoid carryover of liquid BHP into the flow downstream of the generator, because BHP scatters laser light and produces water vapor. The water vapor also decreases the chemical efficiency because of deactivation reactions with the $O_2(^1\Delta)$. Second, the weight and volume of the liquids and gases needed to produce $O_2(^1\Delta)$ tend to be extremely large to sustain a beam or provide multiple beams. There are also problems associated with carrying toxic gases, such as $Cl_2$ which is needed in the classic COIL system for the creation of $O_2(^1\Delta)$. In addition thereto, a significant fraction of the $O_2(^1\Delta)$ is used simply to dissociate $I_2$ into iodine atoms, therefore a significant amount of energy is being used for dissociation rather than for the laser beam. Also, as mentioned above, byproducts from the generator include salt (KCl), which can cause additional problems as noted in U.S. Pat. No. 5,925,286 which is directed to a system generating molecular oxygen in the excited singlet-delta state without significant salt formations. A need therefore exists to provide a chemical oxygen iodine laser that addresses and satisfies these issues.

SUMMARY OF THE INVENTION

In accordance with the present invention a method, system and apparatus provide for an electrically assisted chemical oxygen iodine laser. In the preferred system, the electrically assisted COIL includes a first electrical generator, which receives a first gas consisting of at least $O_2$. The first electrical generator electrically excites the $O_2$ to produce a primary flow of at least $O_2(^1\Delta)$. The primary flow enters a flow channel where it mixes with a secondary flow of already (completely or partially) dissociated $I_2$ molecules (I). The $I_2$ is dissociated previously in a second electrical generator. The secondary flow of dissociated $I_2$ molecules are injected into the primary flow, where they enter a supersonic mixing nozzle to generate excited iodine atoms labeled by $I(^5P_{1/2})$ and which will be referred to as I*. Energy is then extracted from the I* specie by stimulated emission by the radiation fed back by laser cavity mirrors, which is used to produce a 1.315 $\mu$m laser beam. The byproduct gases are exhausted through a scrubber or alternatively exhausted and recycled, if the system is a closed or partially closed loop cycle.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1:
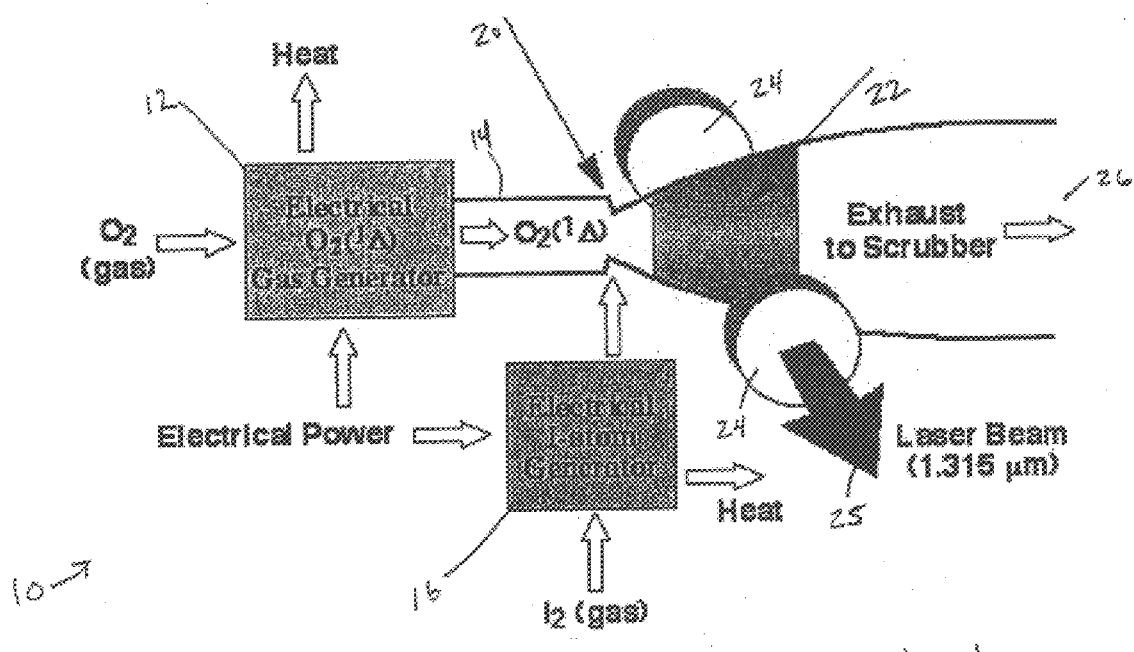
FIG. 1 is a schematic representation of an electrically assisted chemical oxygen iodine laser according to the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

The classic COIL system, while reasonably efficient, includes areas that need improvements. As such, in accordance with the present invention a method, system and apparatus is disclosed that addresses these issues by providing an electrically assisted Chemical Oxygen-Iodine Laser.

Referring now to FIG. 1 an electrically assisted COIL system is illustrated and generally referenced to as 10. The electrically assisted COIL system 10 uses a first electrical generator 12 to produce the singlet-delta oxygen $O_2(^1\Delta)$. As opposed to classic COIL systems that generate $O_2(^1\Delta)$ by chemical reactions among unstable liquids and toxic gases in a singlet-oxygen generator, the electrically assisted COIL system 10 electrically generates the $O_2(^1\Delta)$ from a gas essentially consisting of oxygen gas $O_2$. It is important to note that the term oxygen gas or $O_2$ is used interchangeable and means the same as ground state oxygen, which is also represented herein below in formulas as $O_2(^3\Sigma)$. The present invention may employ various electrical means or technology for the generation of $O_2(^1\Delta)$ from the ground state oxygen $O_2$, discussed in greater detail below.

In addition, a buffer gas may be used with the $O_2$, such as Helium, Nitric Oxide, etc. A buffer gas may for example act as a coolant to absorb some heat or act as a sensitizer gas that helps couple the electrical energy into the flow of oxygen and stabilize the electric field. Alternatively, the introduction of helium will significantly lower the average molecular weight of the flow, consequently speeding it up; when the flow is going faster it can stretch out the laser gain region and it can minimize wall recombination/deactivation effects by reducing the time the gas is in any single area. It is further contemplated that other gases or mixtures may be used, which when passed through the electrical generator, enable the electrons to more efficiently excite or dissociate to generate the $O_2(^1\Delta)$.

By only employing gaseous $O_2$, and the possible addition of a buffer gas, the present invention does not require additional support systems to deal with the removal of salt, or the problems associated with carrying unstable heavy liquids or toxic gases. As such, efficiencies in terms of power to weight ratios dramatically increase. In addition, there are no deactivation effects caused by the water vapor or the scattering of laser light caused by the carryover of BHP.

Moving downstream from the first electrical generator 12, the primary flow consisting of at least $O_2(^1\Delta)$ enters a flow channel 14 where it may mix with diatomic iodine molecules (12) to produce the excited iodine atoms (I*). In the classic COIL system diatomic iodine molecules are simply injected into the primary $O_2(^1\Delta)$ flow. One disadvantage to this is that a large amount of $O_2(^1\Delta)$ is used to dissociate the iodine molecules, using a lot of the energy to dissociate $I_2$ molecules. Approximately 5 $O_2(^1\Delta)$ molecules are needed to dissociate one $I_2$ molecule to the I* state, as such, as much as 20% of the $O_2(^1\Delta)$ molecules may be used up in the classic COIL system. However, it is also known that one singlet-sigma oxygen molecule $O_2(^1\Sigma)$ can dissociate one $I_2$ molecule into two iodine atoms. Thus it would be advantageous to produce $O_2(^1\Sigma)$ as well as the $O_2(^1\Delta)$ molecules to achieve the dissociation and excitation of iodine. While the classic COIL system produces significant amounts of $O_2(^1\Delta)$, it is not an efficient producer of $O_2(^1\Sigma)$. Another advantage over the prior art is that the first electrical generator 12 not only produces singlet-delta oxygen $O_2(^1\Delta)$ but it also produces singlet-sigma oxygen $O_2(^1\Sigma)$, both of which may be used to dissociate the diatomic iodine molecules ($I_2$) into excited iodine atoms (I*). Thereby freeing up energy, which may be used for lasing.

Even with the electrical production of $O_2(^1\Delta)$ and $O_2(^1\Sigma)$, the production of the upper laser level $I(^5P_{1/2})$ still requires 4–5 $O_2(^1\Delta)$ molecules as in the chemical process, a serious loss of potential energy that could be utilized by the laser. It is advantageous to replace the prior art method of simply injecting $I_2$ into the flow with the new scheme of injecting (partially or fully dissociated molecular iodine in either the $I(^5P_{1/2})$ or $I(^5P_{3/2})$ states. As such, the electrically assisted COIL system 10 also includes a second electrical generator 16 (discussed in greater detail below) that receives a gas, of an iodine donor for instance $I_2$, and electrically dissociates the gas into various combinations of iodine atoms (I) and the $I(^5P_{1/2})$ or $I(^5P_{3/2})$ states. Even in the most adverse case of all the iodine appearing in the $I(^5P_{3/2})$ state (the lower laser level), only one $O_2(^1\Delta)$ is required to produce on 1.315 $\mu$m photon by stimulated emission. Preferably the gas essentially consists of diatomic iodine ($I_2$) which when passed through the second electrical generator 16 dissociates into iodine atoms (I). However, other gases may be used which when passed through the second electrical generator 16 electrically generate or dissociate into iodine atoms (I) needed for lasing. The iodine atoms or secondary flow is injected into the primary flow and are mixed with the $O_2(^1\Delta)$ and $O_2(^1\Sigma)$ to obtain the excited iodine atoms I*, and as mentioned above, the presence of $O_2(^1\Sigma)$ may further help dissociate any $I_2$ that have recombined after injection.

Moreover, it may further be advantageous to electrically dissociate the $I_2$ with a buffer of $O_2$ gas. In a classic COIL system it is not practical to use $O_2$ as a buffer gas because it would add more ground state oxygen to the flow, which would reduce laser performance. But in the electrical discharge in $O_2+I_2$, electron impact and the electrically generated $O_2(^1\Sigma)$ will dissociate $I_2$ into two ground state $I(^5P_{3/2})$ atoms with some of those being excited to the $I(^5P_{1/2})$ state by collision with the $O_2(^1\Delta)$ molecules leaving the oxygen in the $O_2(^3\Sigma)$ ground state. While the latter is detrimental to the laser, the $I(^5P_{1/2})$ atom can re-excite $O_2(^3\Sigma)$ back to the $O_2(^1\Delta)$. Thus the added ground state $O_2$ is less than the simple addition of the input to this second generator, and also includes copious quantities of iodine atoms. However, if the $I_2$ and $O_2$ buffer were electrically dissociated prior to injection than the second electrical generator 16 would also electrically generate $O_2(^1\Delta)$ and $O_2(^1\Sigma)$ and assist in the excitation of the iodine atoms.

In both generators, 12 and 16, heat may be rejected through a variety of cooling schemes, well-known in the art, some of which have be previously mentioned above in regards to providing specific buffer gases to lower the temperature.

The primary and secondary flows enter into a supersonic mixing nozzle 20, where it quickly mixes to excite the dissociated iodine atoms into excited iodine atoms (I*). It is further contemplated by the present invention that a subsonic mixing nozzle may alternatively be used. Since the presence of iodine atoms produces high average gain regions near the injection point of the dissociated iodine, the injection point for optimal performance may occur at the throat of the nozzle 20 or downstream of the throat closer to the optical extraction region or laser resonator. The supersonic nozzle 20 is designed such that the flow reaches approximately Mach 2–3 in the laser cavity region 22 and exhibits temperatures in the gain region of about the static temperature (typically <175 Kelvin) needed for efficient lasing.

High reflective laser mirrors 24 coated for the 1.315 $\mu$m wavelength will be positioned downstream of the injection point, typically 2–4 cm downstream. Since there is no water vapor, the mirrors may also be located further downstream with little loss in performance. The ground state Iodine in $I(^5P_{3/2})$ is excited to the laser level $I^*=I(^5P_{1/2})$ by transfer of the energy stored in the $O_2(^1\Delta)$ state and that energy is extracted by stimulated emission of the radiation that builds up between the laser mirrors 24 to produce a beam 23. The gases will then be exhausted through a scrubber 26.

The electrically assisted COIL system 10 may also be a closed or partially closed loop system. Rather than the gases exhausting through a scrubber 26 and then to the atmosphere, the gases may enter a scrubber/recycling system or just a recycling system. The recycling system would filter out any lasing byproducts, leaving a exhaust mix of iodine and oxygen states. The exhaust mix, containing substantially the same mix as the second flow, could then re-enter the second electrical generator 16. Because of the wide disparity in the vapor pressures and molecular mass of $O_2$ and $I_2$. it is even feasible to partially separate the effluent gas by a centrifuge or refrigeration.

While it is known that the existence of a gas discharge requires the presence of electrons, the electrons are being lost by various processes, such as, ambipolar diffusion, attachment, electron-ion recombination, and finite lifetime due to fast flow conditions. Moreover, it is also known that there must be a production process that exactly balances these losses. For a steady discharge, this establishes a "characteristic energy" (or electron temperature) that is directly related to the electric field E (V/cm) to gas density N ($cm^{-3}$) or E/N (V-$cm^2$ or V-$m^2$ in SI units). Since the production requires an electron making an inelastic (or ionizing) collision with a neutral gas atom or molecule producing a new electron and ion while losing the ionization potential in energy—typically 10–15 eV. Thus, the E/N implied by this balance is considerably higher than that required for the production of a lower energy process, such as the production of the $O_2(^1\Sigma)$ requiring 1.63 eV or the production of $O_2(^1\Delta)$ requiring 0.978 eV from the electrons. Thus, one can determine that there would be a value of E/N that would optimize the production of $O_2(^1\Delta)$ and $O_2(^1\Sigma)$, but that it would be considerably lower than that required for a steady-state discharge.

This conflicting requirement is well known in the $CO_2$ laser technology where various schemes have been used to establish the E/N at a value less than that required for a steady-state discharge. Such schemes include: X-ray irradiation; nuclear $\gamma$ radiation; energetic electron beams injected through foils; and UV photon-ionization of additives. While a viable possibility for the COIL system, those schemes are expensive, use complicated technology, and may pose a serious health hazard.

As such the goal of the present invention described herein is to arrange the electrical excitation schemes to attain ionization and optimum excitation of the $O_2(^1\Delta)$ and $O_2(^1\Sigma)$ states.

Figure 2A:
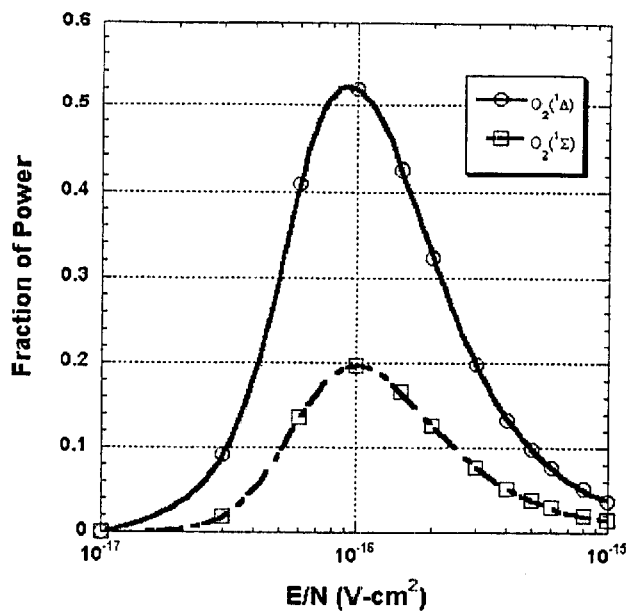
FIG. 2a is a graphic representation of the results for a Bolztmann calculation for the fraction of power versus E/N for pure $O_2$.
Figure 2B:
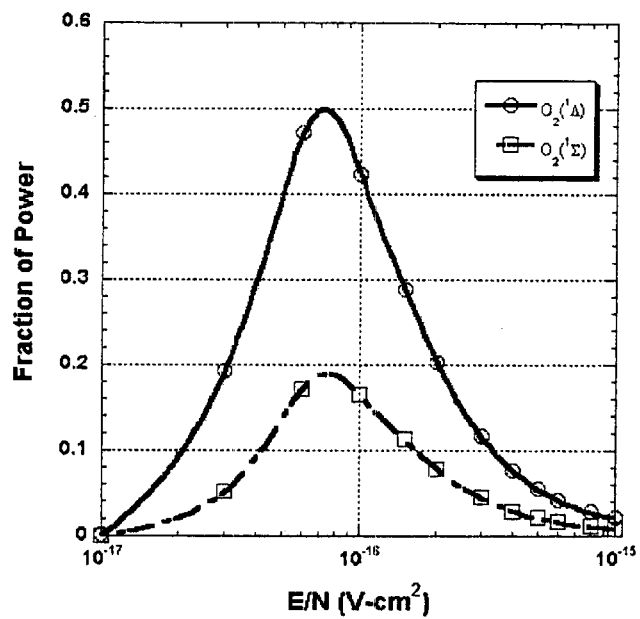
FIG. 2b graphic representation of the results for a Bolztmann calculation for the fraction of power versus E/N for a mixture of He:$O_2$=1:1 ratio.

FIGS. 2a and 2b illustrate the optimization problem facing the present invention. Shown therein is the fraction of the electrical power used to produce the $O_2(^1\Delta)$ and $O_2(^1\Sigma)$ in pure $O_2$ (FIG. 2a) and in a 1:1 mixture of Helium and $O_2$ (FIG. 2b). For pure $O_2$, 50% of the electrical power is used to produce $O_2(^1\Delta)$, and 20% used to produce $O_2(^1\Sigma)$ at E/N=$10^{-16}$ V-$cm^2$, whereas the optimum E/N=$8\times10^{-17}$ V-$cm^2$ for a 1:1 mixture of He:$O_2$ and slightly higher efficiencies.

Unfortunately, that same Boltzmann analysis suggests an E/N of approximately $10^{-15}$ V-$cm^2$ so that the production (ionization) would balance the loss. At that value of E/N, the fraction of electrical power used for the desirable excitation of the $O_2(^1\Delta)$ and $O_2(^1\Sigma)$ states would be miniscule. Fortunately, the present invention can optimize the excitation of the $O_2(^1\Delta)$ and $O_2(^1\Sigma)$ states while maintaining a significant time averaged electron density.

It has been determined that by combining a high E/N pulsed discharge, whose role is to multiply the electron density by factors of 10–100 or more in very short time intervals, with a steady E/N that uses those electrons to excite the ground state $O_2(^3\Sigma)$ molecules to the desired state the above mentioned goal may be achieved. In addition, the duration of the high E/N pulse discharge would be a very small fraction of the repetition period, whereas the low E/N source would be on more-or-less continuously.

The schematic for this first electrical generator 12 may employ any of the well known forms of a discharge: pulsed or steady excitation; capacitive or conductive; with frequencies ranging from DC, 60 Hz, RF (10's of MHz), to microwaves (f>1000 MHz). One possible combination that accomplishes the goals indicated in the previous paragraph utilizes two discharges: a pulsed direct current discharge between two internal electrodes to create the electrons and an RF discharge to provide near optimum E/N for the production of $O_2(^1\Delta)$ and $O_2(^1\Sigma)$. Other combinations are possible: two RF discharges; two microwave discharges; audio frequency discharge; or any permutation and combination.

Figure 3:
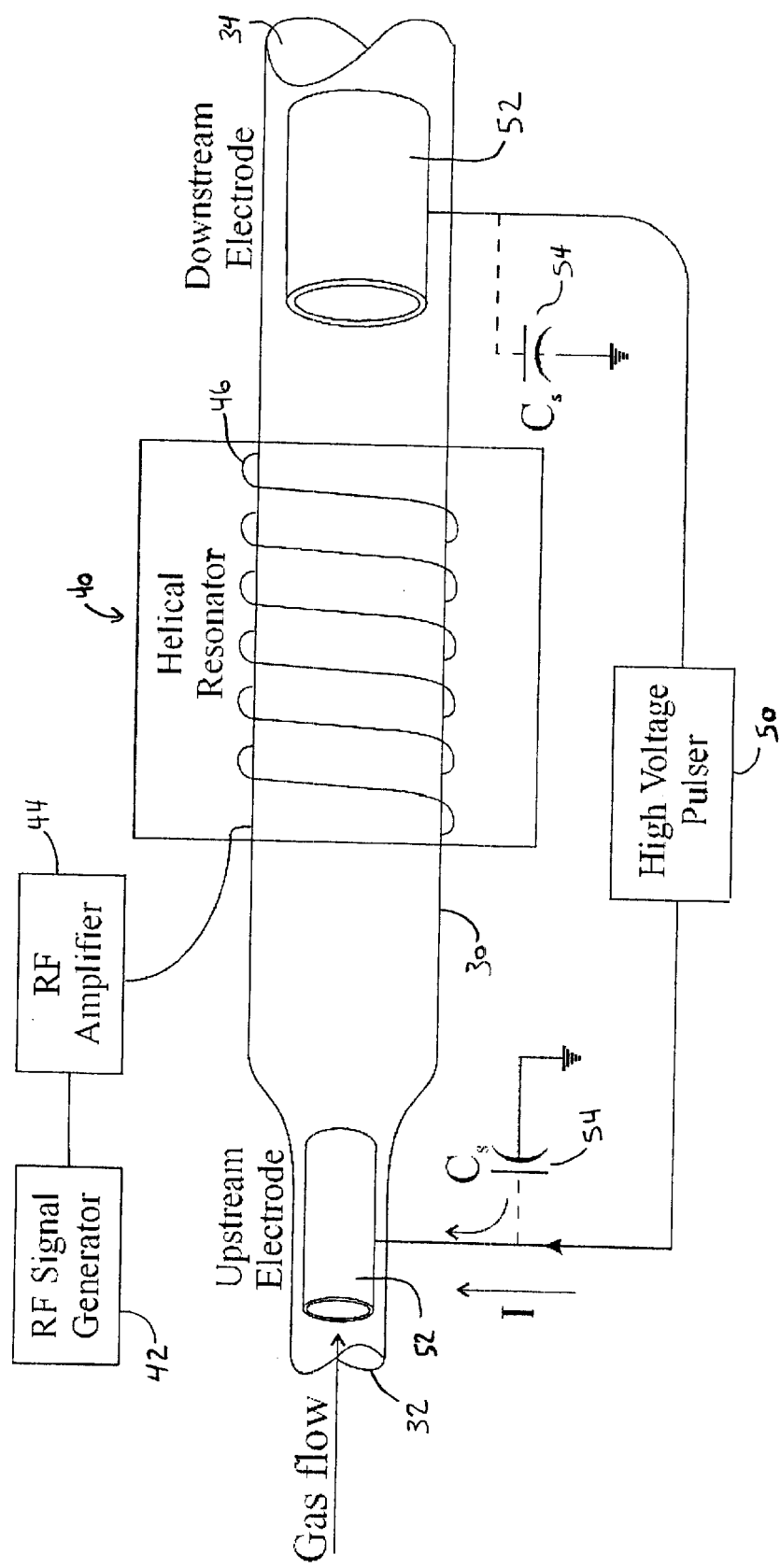
FIG. 3 is a schematic representation of the first electrical generator using an helical RF discharge in combination with a high-voltage pulser.

Referring now to FIG. 3, the first electrical generator 12. includes a helical RF discharge 40 in combination with a high-voltage source 50. The first electrical generator 12 excites the gas contained in the glass tube 30 with an entrance 32 and an exit 34 where two electrodes 52 are separately placed. The high-voltage AC source 50 also includes a pair of capacitors 54 that acts as a peaking circuit for the directly coupled discharge, and thus generates a pulsed discharge. The helical resonator discharge 40 includes an RF signal generator 42 feeding an RF amplifier 44 that drives the helical resonator 46. The glass tube 30 is coaxial with the helical resonator 46.

In operation, the $O_2$ gas (including a buffer) enters the glass tube 30 at the entrance 32 and is electrically excited by the pulse discharge created by the high-voltage pulser 50 and the helical RF discharge 40. The $O_2(^1\Delta)$ and the $O_2(^1\Sigma)$ are created in the first electronic generator 12 and exit through exit opening 34, which is connected to the flow channel 14. Moreover, by adjusting the pulse frequency and the pulse length of the high-voltage pulser 50 the RF frequency can better optimize the production of the excited oxygen states.

Alternatively the high-voltage pulser 50 may be replaced with a pre-ionization AC discharge. The pre-ionization AC discharge would include an AC discharge transformer coupled to the electrodes 52. Having similar characteristics as the high-voltage pulser 50, the AC discharge transformer would charge the capacitors 54 to the break-down voltage and then the plasma in the glass tube would provide a path for the stored charge to be discharged. This repetitive pulse scheme would thus have similar characteristics as the high-voltage pulser 50.

The second electrical generator 16 employed to dissociate the $I_2$ may include, but is not limited to, an RF discharge, chemical reactions, microwave discharge, photolytic pumping or dissociation by providing a high temperature environment. As mentioned above, this secondary flow is then injected into the primary flow through a series of injection holes, such as provided in the classic COIL system. However to reduce iodine atom recombination, these injection holes may be larger than the standard 0.016"–0.032" diameter used in a classic COIL system.

Figure 4:
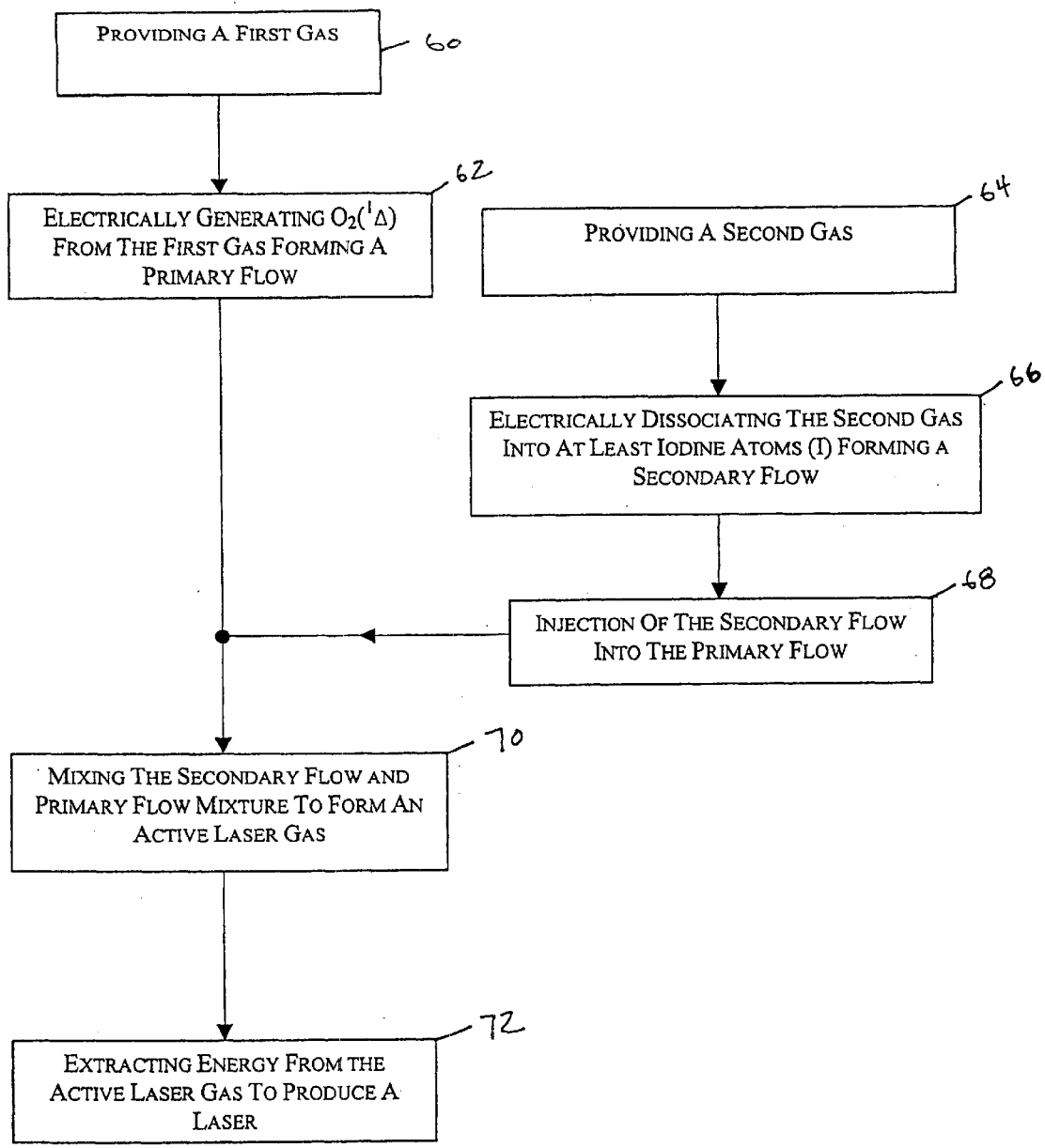
FIG. 4 is a block diagram illustrating the preferred method of the present invention.

Referring now to FIG. 4, a flow diagram illustrates the preferred method for electrically assisting a chemical oxygen iodine laser. The method, begins by providing a first gas preferably containing at least ground state oxygen, Step 60. While the gas may only contain $O_2$ it may further contain a buffer gas or other gases as mentioned above. Following step 60, the method electrically generates the $O_2(^1\Delta)+O_2(^1\Sigma)$ from the first gas, forming a primary flow, Step 62. In addition thereto, the method further includes the step of providing a second gas, preferably containing at least diatomic iodine ($I_2$), Step 64. From step 64, the method would electrically dissociate or generate at least iodine atoms (I) from the second gas, further forming a secondary flow, Step 66. The method then injects the secondary flow into the primary flow, step 68. The primary and secondary flows then mix to form a laser-active gas, preferably containing excited iodine atoms, Step 70, which is used to extract energy for lasing, step 72.

As such the present invention provides for a method, system and apparatus for an electrically assisted COIL laser. The present invention is an all gas COIL laser, reducing the aforementioned disadvantages in relation to the weight constraints and the transportation of highly toxic substances. There is also no unwarranted by-products from the generation of $O_2(^1\Delta)$, thereby eliminating heavy and cumbersome subsystems required to remove products like salt. There is also no deactivation reactions caused by water vapor since no hydrogen atoms are being introduced into the electrically assisted COIL laser. The present invention may further be used in conjunction with a land, sea, space or air based COIL laser, as the aforementioned benefits may be applicable to each.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An oxygen-iodine laser system having a laser resonator with a laser-active gas mixture of at least excited oxygen and dissociated iodine flowing therethrough, comprising:
    a first electrical generator in which a primary flow comprising of at least said excited oxygen is electrically generated from a first gas comprising of at least ground state oxygen, the first electrical generator having at least a pulsed discharge and a continuous wave discharge to maintain a ratio of electric field-to-gas density in order to excite the first gas to form at least the excited oxygen;
    a second electrical generator in which a secondary flow comprising of at least dissociated iodine atoms is electrically generated from a second gas comprising of at least diatomic iodine; and
    an injector which injects the secondary flow into the primary flow to generate the laser-active gas mixture.

2. The oxygen-iodine laser system of claim 1, wherein the first electrical generator includes:
    a flow tube having an entrance for receiving the first gas and an exit for expelling the primary flow;
    a pair of electrodes oppositely positioned about the entrance and the exit;
    a high voltage pulser in communication with the pair of electrodes to provide the pulsed discharge;
    a helical resonator positioned between the two electrodes; and
    an RF signal generator and amplifier coupled to a helical resonator to provide the continuous wave discharge.

3. The oxygen-iodine laser system of claim 1, wherein the second electrical generator may include but is not limited to an RF discharge, a electric-chemical discharge, a microwave discharge, a photolytic discharge or dissociation by providing a high temperature environment.

4. The oxygen-iodine laser system of claim 3, wherein the second gas further includes ground state oxygen gas.

5. An electrically assisted chemical oxygen-iodine laser comprising:
    a first gas including at least ground state oxygen;
    a first electrical generator to electrically excite the first gas to produce a primary flow of at least singlet-delta oxygen;
    a flow channel connected to the first electrical generator such that the primary flow may travel therethrough;
    a second electrical generator to electrically dissociate a second gas to produce a secondary flow, wherein the second gas includes at least diatomic iodine and the secondary flow includes at least dissociated iodine atoms;
    an injector connected to the second electrical generator such that the injector may inject the secondary flow into the primary flow;
    a mixing nozzle positioned downstream of the flow channel, wherein when the primary and secondary flows mix in said mixing nozzle the primary flow may excite the secondary flow to form an excited iodine specie;
    a pair of high reflectivity laser mirrors, coated at 1.315 $\mu$m and positioned downstream of the injector such that the mirrors form a laser resonator to extract energy from the excited iodine specie to produce a laser beam; and
    an exhaust positioned downstream of the high reflective laser mirrors.

6. The oxygen-iodine laser of claim 5, wherein the first gas further includes a buffer gas.

7. The oxygen-iodine laser of claim 6, wherein the first electrical generator employs at least two electric discharge schemes to maintain a ratio of electric field-to-gas density in order to excite the first gas to form at least the excited oxygen.

8. The oxygen-iodine laser of claim 7, wherein one of the electric discharge schemes includes a pulsed discharge.

9. The oxygen-iodine laser of claim 8, wherein the pulsed discharge is a high-voltage pulser.

10. The oxygen-iodine laser of claim 8, wherein the pulsed discharge is a pre-ionization AC discharge.

11. The oxygen-iodine laser of claim 7, wherein one of the electric discharge schemes is a continuous wave discharge.

12. The oxygen-iodine laser of claim 11, wherein the continuous wave discharge is a RF discharge.

13. The oxygen-iodine laser of claim 5, wherein the second electrical generator may include but is not limited to an RF discharge, a electric-chemical discharge, a microwave discharge, a photolytic discharge or a thermal dissociation discharge.

14. The oxygen-iodine laser of claim 13, wherein the second gas further includes ground state oxygen.

15. A method of producing an oxygen iodine laser comprising the steps of:
    providing a first gas;
    using a pulsed discharge and a continuous wave discharge to electrically generate at least singlet delta oxygen from the first gas, forming a primary flow;
    providing a second gas;
    electrically generating at least dissociated iodine atoms from the second gas comprising of at least diatomic iodine, forming a secondary flow;
    injecting the secondary flow into the primary flow;
    mixing the secondary flow and the primary flow to generate a mixture of a laser-active gas;

extracting energy from the mixture to produce a laser beam; and exhausting the mixture.

16. The method of claim 15 wherein the step of providing a first gas includes the step of providing at least ground state oxygen gas.

17. The method of claim 15 wherein the step of mixing the secondary flow and the primary flow generates a laser-active gas including at least an excited iodine specie.

18. The method of claim 15, wherein the step of providing a first gas further includes providing a buffer gas.

19. The method of claim 17, wherein the step of providing a second gas further includes providing oxygen gas.

20. An all gas-phase oxygen-iodine laser system comprising:
- a means for electrically generating a flow of singlet delta oxygen from a first gas;
- a means for electrically generating dissociated iodine atoms from a second gas comprising of at least diatomic iodine;
- a means for injecting the dissociated iodine atoms into the flow of singlet delta oxygen;
- a means for mixing the dissociated iodine atoms and the singlet delta oxygen to generate a laser-active gas mixture;
- a means for extracting the energy from the laser-active gas mixture to produce a laser beam; and
- a means for exhausting the laser-active gas mixture subsequent to producing said laser beam.

21. The system of claim 20, wherein the first gas includes at least ground state oxygen gas.

22. The system of claim 21, wherein the laser-active gas mixture includes at least excited iodine atoms.

23. The system of claim 22, wherein the ground state oxygen gas is initially mixed with a buffer gas.

24. The system of claim 23, wherein the means for electrically generating the flow of singlet delta oxygen includes at least two electrical discharge schemes.

25. The system of claim 24, wherein the two electrical discharge schemes maintain a ratio of electric field-to-gas density in order to excite the ground state oxygen gas to form at least the singlet delta oxygen.

26. The system of claim 25, wherein the two electrical discharge schemes include a pulsed excitation source coupled to a continuous wave excitation source.

27. The system of claim 26, wherein the pulsed excitation source is a high-voltage pulser.

28. The system of claim 26, wherein the continuous wave excitation source is a RF discharger.

29. The system of claim 26, wherein the second gas further includes ground state oxygen gas.

30. The system of claim 29, wherein the exhausting means recycles at least a portion of the laser-active gas mixture to the second gas.

31. The system of claim 30, wherein the means for electrically generating the dissociated iodine atoms includes but is not limited to one of the following electrical discharge schemes: an RF discharger, a electric-chemical discharger, a microwave discharger, a photolytic discharger or dissociation by providing a high temperature environment.

32. The oxygen-iodine laser system of claim 1, wherein the first electrical generator includes:
- a flow tube having an entrance for receiving the first gas and an exit for expelling the primary flow;
- a pair of electrodes oppositely positioned about the entrance and the exit;
- a high voltage pulser in communication with the pair of electrodes to provide the pulsed discharge;
- an RF discharge positioned between the two electrodes; and
- an RF signal generator and amplifier coupled to a RF discharge to provide the continuous wave discharge.

* * * * *